United States Patent
Kiciman et al.

(10) Patent No.: US 10,867,123 B2
(45) Date of Patent: Dec. 15, 2020

(54) SOCIAL BROWSING

(75) Inventors: Emre Mehmet Kiciman, Seattle, WA (US); Wissam Kazan, Redmond, WA (US); Chun-Kai Wang, Bellevue, WA (US); Aaron C. Hoff, Kirkland, WA (US); Felipe Luis Naranjo, Seattle, WA (US); Francislav P. Penov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 619 days.

(21) Appl. No.: 12/614,457

(22) Filed: Nov. 9, 2009

(65) Prior Publication Data
US 2011/0113349 A1    May 12, 2011

(51) Int. Cl.
| | |
|---|---|
| *G06F 40/169* | (2020.01) |
| *G06Q 10/10* | (2012.01) |
| *G06F 16/9535* | (2019.01) |
| *G06F 16/38* | (2019.01) |
| *G06F 16/30* | (2019.01) |
| *G06F 16/335* | (2019.01) |
| *G06F 16/957* | (2019.01) |
| *G06F 40/20* | (2020.01) |
| *H04L 12/58* | (2006.01) |
| *G06F 16/958* | (2019.01) |

(52) U.S. Cl.
CPC ............ *G06F 40/169* (2020.01); *G06F 16/30* (2019.01); *G06F 16/335* (2019.01); *G06F 16/38* (2019.01); *G06F 16/957* (2019.01); *G06F 16/9535* (2019.01); *G06F 16/972* (2019.01); *G06F 40/20* (2020.01); *G06Q 10/10* (2013.01); *H04L 51/32* (2013.01)

(58) Field of Classification Search
CPC ...... G06F 17/27; G06F 16/38; G06F 16/9535; G06F 16/972; G06F 16/30; G06F 16/335; G06F 40/20; G06Q 10/10; H04L 51/32

USPC .......................................................... 715/753
See application file for complete search history.

(56) References Cited

U.S. PATENT DOCUMENTS 5,832,480 A * 11/1998 Byrd et al.
7,788,245 B1    8/2010 Eddings et al.
(Continued)

FOREIGN PATENT DOCUMENTS

| EP | 2107480 A1 | 10/2009 |
| JP | 2007-279901 A | 10/2007 |

(Continued)

OTHER PUBLICATIONS

"International Search Report", dated May 20, 2011, Application No. PCT/US2010/052009, Filed Date: Oct. 2010, pp. 1-8.
(Continued)

*Primary Examiner* — Kavita Padmanabhan
*Assistant Examiner* — Tionna M Burke
(74) *Attorney, Agent, or Firm* — Medley, Behrens & Lewis, LLC

(57) ABSTRACT

A method described herein includes acts of extracting at least one entity from an arbitrary web page being viewed by an individual on a computing device and comparing the at least one entity with social network data of the individual, wherein the social network data comprises a plurality of messages generated by members of a social network of the individual. The method further includes the acts of identifying at least one message in the plurality of messages based at least in part upon the comparing of the at least one entity with the social network data of the individual and causing the at least one message to be displayed on the web page in conjunction with the at least one entity.

3 Claims, 11 Drawing Sheets

(56) References Cited

U.S. PATENT DOCUMENTS

| | | | |
|---|---|---|---|
| 7,954,058 | B2 | 5/2011 | Kalaboukis et al. |
| 2005/0216300 | A1 | 9/2005 | Appelman et al. |
| 2006/0242574 | A1 | 10/2006 | Richardson et al. |
| 2007/0043583 | A1 | 2/2007 | Davulcu et al. |
| 2007/0043688 | A1 | 2/2007 | Kountz et al. |
| 2007/0073756 | A1* | 3/2007 | Manhas ............ G06F 17/30663 |
| 2007/0233692 | A1 | 10/2007 | Lisa et al. |
| 2008/0134040 | A1* | 6/2008 | Pennington et al. ......... 715/733 |
| 2008/0154915 | A1 | 6/2008 | Flake et al. |
| 2008/0222143 | A1 | 6/2008 | Backer et al. |
| 2009/0037355 | A1 | 2/2009 | Brave et al. |
| 2009/0070700 | A1* | 3/2009 | Johanson ...................... 715/776 |
| 2009/0106270 | A1 | 4/2009 | Shukla et al. |
| 2009/0112701 | A1 | 4/2009 | Turpin et al. |
| 2009/0119259 | A1 | 5/2009 | Williams et al. |
| 2009/0138565 | A1 | 5/2009 | Shiff et al. |
| 2009/0144609 | A1 | 6/2009 | Liang et al. |
| 2009/0150388 | A1 | 6/2009 | Roseman et al. |
| 2009/0158163 | A1 | 6/2009 | Stephens et al. |
| 2009/0182589 | A1 | 7/2009 | Kendall et al. |
| 2009/0192871 | A1 | 7/2009 | Deacon et al. |
| 2009/0234909 | A1 | 9/2009 | Strandell et al. |
| 2009/0254836 | A1 | 10/2009 | Bajrach |
| 2009/0282002 | A1* | 11/2009 | Reeder et al. ..................... 707/3 |
| 2009/0287774 | A1* | 11/2009 | Punera et al. ................ 709/204 |
| 2009/0313244 | A1 | 12/2009 | Sokolenko et al. |
| 2010/0023506 | A1 | 1/2010 | Sahni et al. |
| 2010/0030715 | A1* | 2/2010 | Eustice .................. G06Q 10/10 706/12 |
| 2010/0094878 | A1 | 4/2010 | Soroca et al. |
| 2011/0004525 | A2* | 1/2011 | Byrne ........................ 705/14.67 |
| 2011/0137989 | A1 | 6/2011 | Kiciman et al. |
| 2011/0302152 | A1 | 12/2011 | boyd et al. |
| 2012/0330932 | A1 | 12/2012 | Boyd et al. |

FOREIGN PATENT DOCUMENTS

| | | |
|---|---|---|
| JP | 2008-539508 A | 11/2008 |
| JP | 2011503700 A | 1/2011 |
| KR | 1020050096422 A | 10/2005 |
| KR | 1020080049457 A | 6/2008 |
| RU | 2008105919 A | 9/2009 |
| WO | 2006115718 A2 | 11/2006 |
| WO | 2007141020 A1 | 12/2007 |
| WO | 2009102391 A1 | 8/2009 |

OTHER PUBLICATIONS

Golbeck, et al., "SocialBrowsing: Integrating Social Networks and Web Browsing", retrieved at <<http://trust.mindswap.org/papers/GolbeckWasserWIP.pdf>>, CHI 2007. pp. 1-6.
"Put the Social Web in Context with Glue's New Browser Plugin", retrieved at <<http://www.semantic-web.at/index.php?id=1&subid=57&action=resource&item=2226>>, Aug. 23, 2006. pp. 1-2.
Gaulin, "How Social Browsing will Change your Life", retrieved at <<http://www.associatedcontent.com/article/53280/how_social_browsing_will_change_your.html>>, Aug. 23, 2006. pp. 1-4.
Culotta, et al. "Extracting Social Networks and Contact Information from email and the Web", retrieved at <<http://www2.selu.edu/Academics/Faculty/aculotta/pubs/culotta04extracting.pdf>>, 2005. pp. 1-8.
Want, et al. "Extracting, Presenting and Browsing of Web Social Information", retrieved at <<http://yi.wang.2005.googlepages.com/ExtractingPresentingandBrowsingofWebSocialInformation.pdf>>, WAIM 2005. pp. 828-833.
International Search Report and Written Opinion Received for PCT Application No. PCT/US2010/052009, dated May 20, 2011, pp. 1-8.
"EveryZing Launches ezSEO", Feb. 27, 2008, Retrieved at <<http://www.altsearchengines.com/2008/02/27/everyzing-launches-erseo/>>, pp. 1-5.
Grineva, et al., "Extracting Key Terms from Noisy and Multi-theme Documents", Apr. 20-24, 2009, Retrieved at <<http://www2009.org/proceedings/pdf/p661.pdf>>, pp. 661-670.
Glance, et al., "Deriving Marketing Intelligence from Online Discussion", Aug. 21-24, 2005, Retrieved at <<http://www.kamalnigam.com/papers/aw-kdd05.pdf>>, pp. 1-10.
Kola, et al., "Searching and Analysis of Text Streams" Oct. 21, 2009, Retrieved at << http://www.cse.iitk.ac.in/users/dilipkk/BTPsubmit/term1final.pdf>> pp. 1-6.
Office Action dated Jul. 18, 2011, U.S. Appl. No. 12/633,798, pp. 1-12.
Reply to Office Action dated Jul. 18, 2011, U.S. Appl. No. 12/633,798, filed Dec. 15, 2011, pp. 1-13.
Final Office Action dated Mar. 26, 2012, U.S. Appl. No. 12/633,798, pp. 1-13.
Reply to Final Office Action dated Mar. 26, 2012, U.S. Appl. No. 12/633,798, filed Jun. 18, 2012, pp. 1-7.
Office Action dated Jul. 16, 2012, U.S. Appl. No. 12/633,798, pp. 1-14.
Reply to Office Action dated Jul. 16, 2012, U.S. Appl. No. 12/633,798, filed Nov. 16, 2012, pp. 1-7.
Final Office Action dated Dec. 20, 2012, U.S. Appl. No. 12/633,798, pp. 1-17.
Gupta, et al., "A Novel Framework for Context Based Distributed Focused Crawler (CBDFC)," Int. J. Computer and Communication Technology, vol. 1, No. 1, pp. 14-26, 2009.
Georgiadis, et al., "Context-Based Humanized and Authorized Personalization in Mobile Commerce Applications," International Journal of Computing & Information Sciences, vol. 3, No. 2, pp. 1-9, Aug. 2005.
Murthy, et al., "Context Filters for Document-Based Information Filtering," Fifth International Conference on Document Analysis Recognition, ICDAR '99, pp. 1-4, Bangalore, India Sep. 1999.
Golbeck, et al., "SocialBrowsing: Integrated Social Networks and Web Browsing", CHI 2007, pp. 2381-2386, 2007.
Yoshida, et al., "WeBrowSearch: Toward Web Browser with Autonomous Search", WISE 2007, LNCS 4831, pp. 135-146, 2007.
Ma, et al., "WebTelop: Dynamic TV-Content Augmentation by Using Web Pages", ICME 2003, pp. 173-176, 2003.
Kraft, et al., "YIQ: Contextual Search at the Point of Inspiration", CIKM '05, pp. 816-823, 2005.
Office Action dated Feb. 9, 2012, U.S. Appl. No. 12/795,392, pp. 1-22.
Reply to Office Action dated Feb. 9, 2012, U.S. Appl. No. 12/795,392, filed May 2, 2012, pp. 1-12.
Office Action dated May 31, 2012, U.S. Appl. No. 12/795,392, pp. 1-21.
"Patent Examination Report No. 1", Application No. 2010315738, IP Australia, dated Feb. 14, 2014, 3 pages.
"Put the Social Web in Context With Glue's New Browser Plugin", Oct. 28, 2008, Retrieved at <<http://www.semantic-web.at/index.php?id=1&subid=57&action=resource&item=2226>>, Retrieval Date: Nov. 12, 2009, pp. 1-2.
Gaulin, "How Social Browsing Will Change Your Life", Aug. 23, 2006, Retrieved at <<http://www.associatedcontent.com/article/53280/how_social_browsing_will_change_your.html>>, Retrieval Date: Nov. 12, 2009, pp. 1-4.
Culotta, et al., "Extracting Social Networks and Content Information from Email and the Web", 2004, pp. 1-8.
Wang, et al., "Extracting, Presenting and Browsing of Web Social Information", WAIM 2005, LNCS 3739, 2005, pp. 828-833.
"First Office Action", State Intellectual Property Office of the Peoples' Republic of China, dated Feb. 20, 2013, pp. 1-9.
"Second Office Action", State Intellectual Property Office of the Peoples' Republic of China, dated Nov. 5, 2013, pp. 1-7.
"Office Action Issued in Japanese Patent Application No. 2012-538823", dated Sep. 10, 2014, 6 pages.
"Notice of Allowance Issued in Russian Patent Application No. 2012118387", dated Jul. 13, 2015, 18 Pages.
"Office Action Issued for Russian Patent Application No. 2012118387", dated Feb. 25, 2015, 4 Pages.

(56) References Cited

OTHER PUBLICATIONS

Rotard, et al., "Semantic Lenses: Seamless Augmentation of Web Pages with Context Information from Implicit Queries", In Proceedings of the Computers & Graphics, vol. 31, Issue 3, May 15, 2007, pp. 361-369.
"Supplementary Search Report for European Application No. 10828734.3", dated Apr. 1, 2015, 9 Pages.
"Office Action Issued in Japan Patent Application No. 2012-538823", dated Jun. 9, 2015, 10 Pages.
Kawaba, et al., "Blog Distillation for Linking Wikipedia Entries to Blog Feeds", In 19th Data Engineering Workshop Letters, Institute of Electronics, Information and Communication Engineers, Apr. 7, 2008, 9 Pages.
Masuda, T., "Check out this service and enjoy Internet more! ~ Have standard Web services at your fingertips", In Mac Fan, by Mainichi Communications Co., Ltd., Oct. 1, 2007, 4 Pages.
Toda, et al., "BLOGRANGER: Implementation of Goal-oriented Blog Search Engine", In Information Processing Society of Japan, vol. 48, Sep. 15, 2000, 22 Pages.
"Office Action Issued in Canadian Patent Application No. 2779448" dated Aug. 26, 2016, 5 Pages.
"Notice of Allowance Issued in Japanese Patent Application No. 2012-538823", dated Jan. 19, 2016, 3 pages. (W/Out English Translation).
"Office Action Issued in European Patent Application No. 10828734.3", dated Feb. 21, 2017, 9 Pages.
"Office Action Issued in Korean Patent Application No. 10-2012-7011899", dated Feb. 20, 2017, 10 Pages.

* cited by examiner

SOCIAL BROWSING

BACKGROUND

Online social networking applications are becoming increasingly popular. People rely on such applications to keep in touch/interact with friends and family. Typically, to utilize such an online social networking application, an individual will log into a website that corresponds to the application and will be provided with a visual depiction of messages sent to the user as well as status updates of contacts of the user. Other mechanisms for sharing information with contacts, such as photographs and video, are also available on many online social networking applications.

While these online social networking applications are useful tools that allow people to interact with contacts, in some instances it may be inconvenient for a particular individual to log into a website, review social networking content, generate replies to messages, and the like. For instance, if the individual is performing a particular task through utilization of a browser, the user must interrupt such task to utilize a social networking application. This places an additional burden on the individual with respect to interacting with friends by removing the individual from a desired context. Often, the individual may be unaware that messages in their social network are relevant to their current task. It is impractical, however, to push each social networking message/update to the individual when the individual is performing other tasks. Displaying numerous messages may interrupt the focus of the user while the user is attempting to perform other tasks.

SUMMARY

The following is a brief summary of subject matter that is described in greater detail herein. This summary is not intended to be limiting as to the scope of the claims.

Described herein are various technologies pertaining to social networking in general and to context-sensitive social networking in particular. The technology described herein pertains to providing an individual that is viewing an arbitrary web page with social networking messages that are in some way are related to content of the web page. Pursuant to an example, an individual can browse the Internet through utilization of an Internet browser and view content on an arbitrary web page. The content of the web page can be analyzed in an automated fashion to extract certain keywords from the web page, wherein as used herein a keyword may be or include text, a, topic, a name, a place, a date, a phrase, etc. from the web page. For instance, keywords can be extracted from the web page, wherein the keywords can be extracted based at least in part upon frequency of utilization of the keyword (in the web page, general utilization, etc.), determining whether the keyword is in a list of prohibited keywords (whether the keyword is in a "stop" list), etc. Such information can be utilized to ensure that common terms like "the", "or", "and", and other common terms are not extracted from the web page.

Thereafter, the extracted keyword and its context in the web page can be analyzed to determine a canonical meaning of such keyword. For instance, the extracted keyword can be analyzed with respect to a dictionary of canons to determine canonical meaning of the keyword. In an example, the dictionary can be utilized to determine that the keyword "Washington" in the content of the web page refers to the state of Washington, not the city of Washington D.C. or George Washington.

Additionally, messages posted via one or more social networking applications to the individual can be analyzed. A message may be a status update, correspondence intended for a particular individual, profile information such as favorite movies, current location, etc. about a member in the social network of the individual, or other suitable message. Similarly to what has been described above with respect to the content of a web page, content of messages posted via a social networking application can be analyzed. That is, keywords can be extracted from messages and meanings thereof can be ascertained. The keywords and associated meanings can hereafter be referred to as entities.

An entity extracted from the web page may then be compared with entities extracted from a plurality of messages that were posted by contacts of the individual by way of the social networking application. Each message can be assigned a score with respect to each entity extracted from the web page. A score for a message can be based at least in part upon the aforementioned comparison, certain words existent in the message, uniqueness of content of the message, an amount of time that has passed since the message was posted via the social networking application, whether or not the individual has previously read the message, an amount of time that has passed since the individual has read the message, whether the individual selected any links that correspond to the message, explicit feedback pertaining to the message as provided by the individual, an identity of the poster of the message (e.g., whether the poster is someone who interacts frequently with the individual), amongst other parameters. The social networking messages can be ranked with respect to an entity extracted from a web page based at least in part upon these scores.

If one or more of the messages have been assigned a score that is above a predefined threshold, the keyword that corresponds to the extracted entity can be highlighted in the web page. Thus, the individual viewing the web page can quickly ascertain that a contact has posted a message via a social networking application that is in some way related to the highlighted content. The individual may then choose to select the highlighted content—for instance, by hovering a mouse pointer over the content for a particular period of time. This can cause an entirety of a social networking message or series of messages to be presented to the individual in conjunction with content of the web page. The social networking message can be presented to the individual as an inline popup, as a sidebar, or other suitable form.

In another aspect, a reply field can be displayed together with the message. The individual may then reply to the message such that the reply can be transmitted to the poster of the social networking message, posted to a profile of the individual on an online social networking website, or the like. Additionally or alternatively, other mechanisms for providing feedback with respect to the message can be displayed with the message, such as one or more buttons that can be selected to indicate whether the individual liked or disliked the message.

Other aspects will be appreciated upon reading and understanding the attached figures and description.

DETAILED DESCRIPTION

Figure 1:
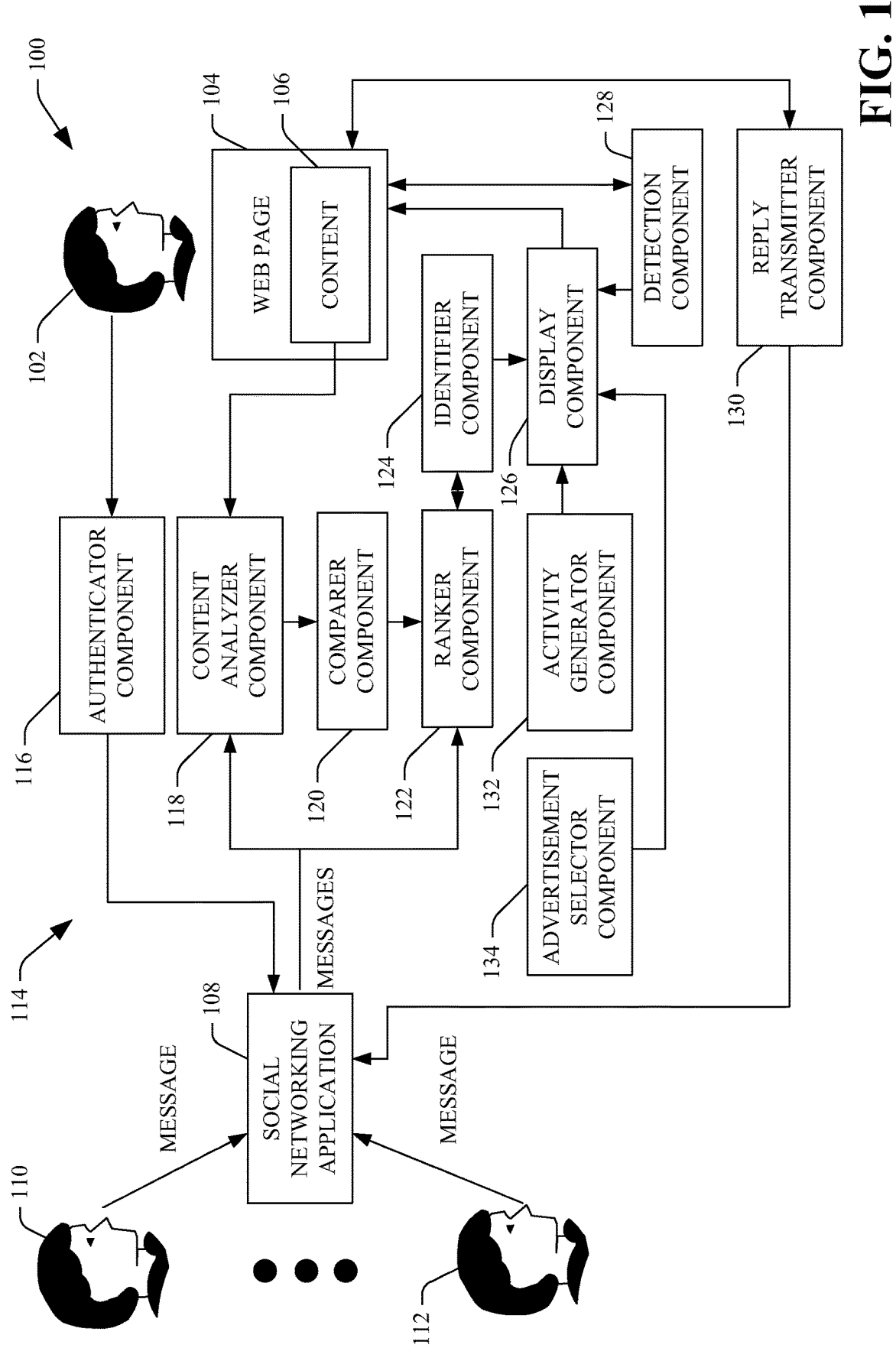
FIG. 1 is a functional block diagram of an example system that provides an individual with a social networking message that is related to content of an arbitrary web page being viewed by the individual.

Various technologies pertaining to social networking in general, and in particular to presenting social networking messages together with related content on an arbitrary web page viewed by an individual that is an intended recipient of the social networking message will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates presenting a social networking message to an individual together with content related to such social networking message on an arbitrary web page being viewed by the individual is illustrated. An individual 102 can utilize an Internet browser to load a particular web page 104, wherein the web page comprises content 106. The web page 104 may be an arbitrary web page—that is, the web page 104 need not be of a particular category, need not have particular tags assigned thereto, etc. Thus, the web page 104 may be a web page related to news, sports, shopping, or any other web page that is desirably viewed by the individual 102.

The individual 102 can subscribe to at least one social networking application 108. For example, the social networking application 108 may be an online application that allows the individual 102 to create a profile, receive updates from contacts of the individual 102, post pictures, videos, commentary, and the like for contacts of the individual 102 to review, receive pictures, videos, commentary, and the like from contacts of the individual 102, etc. It is to be understood, however, that the social networking application 108 may be included in an application whose main functionality pertains to activities other than social networking. For example, an online movie rental application may include the social networking application 108 to allow individuals to identify friends such that movie ratings/recommendations can be shared between friends. In another example, an online retailer may allow an individual to identify friends, such that product recommendations, "wish lists", and comments pertaining to products can be shared between friends. Furthermore, the social networking application 108 may or may not require reciprocity between contacts (e.g., in some social networking applications, a first individual and a second individual must mutually accept one another as "friends" to allow transmittal and receipt of messages between the first individual and second individual).

Furthermore, the social networking application 108 may receive and post status updates of contacts of the individual 102, such that if a contact of the individual 102 changes their status, such status change can be posted in a news feed on a web page of the individual 102 as provided by the social networking application 108. In another example, the social networking application 108 may be a broadcasting application that broadcasts short amounts of text to a plurality of subscribers. Therefore, again, the individual 102 may subscribe to the social networking application 108 and may have a plurality of contacts 110-112, wherein the plurality of contacts 110-112 can post a plurality of social networking messages for presentation to the individual 102 (and possibly other individuals) on a social networking web page. In another example, the social networking application 108 may be configured for utilization in sharing information between people in a particular enterprise, such as a company, people in a certain organizational structure, project team or teams, etc. In such a case, for instance, mailing lists, organization structure, project teams, and the like can define contacts of the individual 102, and messages, employee profiles, shared documents, and the like can be messages posted via the social networking application 108. In such an example, the individual 102 and the contacts 110-112 can be connected by way of the enterprise (e.g., are each employees of the enterprise, are on a project team together, . . . )

The system 100 comprises an engine 114 that is configured to cause one or more social networking messages posted by one or more of the contacts 110-112 to be displayed in conjunction with the content 106 of the web page 104 when such content 106 is in some way related to the one or more social networking messages. Thus, if the individual 102 is reviewing a web page that pertains to a certain topic, and a contact of the individual 102 has posted a message via the social networking application 108 that is related to such topic, the social networking message can be displayed to the individual 102 together with the content 106 of the web page 104. As will be described in more detail below, mechanisms may be utilized to cause the social networking message to be displayed in an unobtrusive manner, such that the content 106 of the web page 104 is unobstructed unless the individual 102 wishes to review a social networking message that is related to the content 106 of the web page 104.

Pursuant to an example, the engine 114 can be configured as a plug-in to a browser that is utilized to load the web page 104. Thus, actions of the engine 114 may be undertaken entirely on a client computing device utilized by the individual 102 to view the web page 104. For instance, the engine 114 may be composed at least partially of JavaScript code. In another example, the engine 114 may be configured to execute on a server in a computing cloud. Thus, the engine 114 may be configured to execute on a web server. In another example, the engine 114 may be configured to execute entirely on a mobile phone or in a distributed manner across a mobile phone and a computing cloud.

Additional detail pertaining to operation of the engine 114 will now be provided. The engine 114 can include an authenticator component 116 that can receive authentication data pertaining to the individual 102 that identifies the individual 102. For instance, upon the individual 102 initiating a browsing session, the authenticator component 116 can receive authentication data including but not limited to a username, a password, biometric data, etc. The authenticator component 116 may transmit such authentication data to the social networking application 108. The social networking application 108 can authenticate the user, and responsive to such authentication may cause social networking messages posted by the contacts 110-112 of the individual via the social networking application 108 to be provided to the engine. The messages received by the engine 114 may be all messages posted by the contacts 110-112 of the individual 102 via the social networking application 108. In another example, the messages received by the engine 114 may be limited to a threshold number of most recently posted messages, messages from certain contacts identified by the individual 102, messages pertaining to certain topics, certain types of messages, etc. Therefore, the individual 102 may specify exactly which types of messages the individual 102 desires to be provided to the individual 102 when viewing arbitrary web pages.

The engine 114 additionally includes a content analyzer component 118. Upon the individual 102 directing the web browser to load the web page 104, the content analyzer component 118 can analyze the content 106 that is displayed to the individual 102 on the web page 104. Such content 106 may be images, video, text, etc. Pursuant to an example, and as will be described in greater detail below, the content analyzer component 118 can extract at least one entity from the content 106. As used herein, the entity may be a keyword, a topic, a category, a keyword and its associated meaning, or other suitable entity. For example, the content analyzer component 118 may first extract a keyword from the content 106, and may then ascertain a particular meaning of the extracted keyword. If the keyword is "medicine", the entity may be ascertained to pertain to healthcare, a rock band, or a painting by Gustav Klimt.

The content analyzer component 118 may also be configured to analyze content of messages received from the social networking application 108. Specifically, the content analyzer component 118 can extract one or more entities from social networking message received from the social networking application 108. The content analyzer component 118 operate similarly when extracting entities from social networking message as compared to when the analyzer component 118 extracts entities from the content 106 of the web page 104. Thus, the content analyzer component 118 can first extract one or more keywords from the social networking messages and thereafter ascertain a meaning corresponding to such keyword(s). For instance, the content analyzer component 118 can first extract the keyword "Washington" from a social networking message, and may then determine that such keyword refers to the state of Washington and not the city of Washington D.C. or George Washington. The content analyzer component 118 can perform entity extraction on social networking messages as such messages are received from the social networking application 108 and can perform entity extraction on the content 106 of the web page when the web page 104 is loaded by the browser.

The engine 114 may also comprise a comparer component 120 that can compare an entity extracted from the content 106 of the web page 104 with entities extracted from the social networking messages posted by the contacts 110-112 of the individual via the social networking application 108. A ranker component 122 can assign a score to each social networking message based at least in part upon the comparison undertaken by the comparer component 120. Therefore, a social networking message that has an entity extracted therefrom that is substantially similar to the entity extracted from the web page 104 will most likely be assigned a higher score than a social networking message that is not associated with an entity that is substantially similar to the entity extracted from the web page.

In addition to the comparison undertaken by the comparer component 120, the ranker component 122 can assign a score to a social networking message with respect to the entity extracted from the web page 104 based at least in part upon uniqueness of content of the social networking message, whether the individual 102 has previously read the social networking message, an amount of time since the individual read the social networking message 102, explicit feedback provided by the individual 102 pertaining to the social networking message, whether the individual 102 selected one or more links corresponding to the social networking message, an identity of the poster of the social networking message, etc. In an example, the ranker component 112 may assign a higher score to a social networking message with highly unique content when compared to a score assigned to a social networking message with content that is not unique amongst other messages or is not significantly unique from the content 106 of the web page 104 (e.g., if the social networking message is a copy and paste of the content 106 of the web page 104, it would be undesirable to display such social networking message to the individual together with the content 106 of the web page 104). Similarly, if the individual 102 has recently read the social networking message, the score may be lower than a score assigned to a social networking message that has not been recently read (or not been read at all).

An identifier component 124 can identify social networking messages that have been assigned scores above a threshold with respect to an entity extracted from the web page 104. Thus, the identifier component 124 can identify messages that are found to be at least somewhat related to the content 106 of the web page 104. In another example, the identifier component 124 can identify only a most highly ranked message (a message that has been assigned a highest score amongst all social networking message with respect to a particular entity extracted from the content 106 of the web page 104). The threshold utilized by the identifier component 124 may be set by the individual 102. For instance, the individual 102 can specify a maximum number of messages to be identified by the identifier component 124, can specify how related content of a social networking message is to an entity extracted from an arbitrary web page (e.g., the higher the threshold the greater the relation must be between social networking messages and extracted entities), etc.

The engine 114 may also comprise a display component 126 that can cause at least one social networking message identified by the identifier component 124 as being related to an entity extracted from the content 106 of the web page 104 to be displayed in conjunction with the content 106 of the web page 104. In an example, the display component 126 can cause one or more keywords in the web page 104 to be highlighted in some manner, such that the individual 102 can ascertain that a social networking message posted via the social networking application 108 is somewhat related to the highlighted keyword or keywords. For instance, a rectangular box can be drawn around one or more keywords can be underlined, one or more keywords can be bolded, etc. Pursuant to an example, the display component 126 can cause such content to be highlighted without altering HTML code of the web page 104. Therefore, code written into the web page 104 to detect alterations to HTML code in the web page cannot detect the actions of the display component 126. This prevents third parties from capturing data in social networking messages desirably displayed on the web page 104 or from ascertaining which keywords are related to social networking messages posted to the individual 102.

As indicated above, the display component 126 can cause a keyword to be highlighted in an unobtrusive manner, such that if the individual 102 chooses not to review social networking messages that have been found to be related to an entity extracted from the content 106 of the web page 104, the individual 102 can read the content 106 without such content 106 being obstructed. If, however, the individual 102 wishes to view a social networking message together with the content 106, the individual 102 can select highlighted keywords on the web page 104. A detection component 128 can detect such selections, and can indicate to the display component 126 that a selection has been made. A selection may be made by the individual 102 through utilization of a mouse pointer, such that the individual 102 may left click or right click on a highlighted keyword. In another example, the individual may select a highlighted keyword by causing a mouse pointer to hover over a highlighted keyword for a threshold amount of time (e.g., one second). The detection component 128 can be configured to detect any suitable selection of highlighted keywords in the web page 104.

Upon the detection component 128 detecting selection of one or more highlighted keywords, the display component 126 can cause a social networking message to be displayed in conjunction with the content 106 of the web page 104. For instance, the social networking message may be displayed as an inline popup window. The individual 102 may close the inline popup window by selecting a button in the inline popup window or moving a mouse pointer away from the keyword that corresponds to the social networking message. As will be described in greater detail below, the social networking message displayed by the display component 126 may include an identity of a poster of the message, images, text, etc.

In addition, the display component 126 may cause a reply field to be displayed in conjunction with the social networking message (which is displayed on the web page 104). The reply field can be configured to receive a reply to the social networking message from the individual 102. In another example, the reply field can be configured to include a link to the related web content being viewed by the individual 102 in the reply to the social networking message. The engine 114 may include a reply transmitter component 130 that is configured to transmit a reply provided in the reply field by the individual 102 back to the social networking application 108, another social networking application of the choosing of the individual 102, directly to a computing device of the poster of the social networking message, etc. For example, the reply can be desirably posted on a profile page of the individual 102, upon a profile page of the poster of the social networking message, broadcast to a particular group of contacts in the social network of the individual 102, etc. Thus, the individual 102 may undertake social networking activities, including interacting with contacts of the individual, while undertaking normal browsing activities and without having to log into a website that corresponds to the social networking application 108.

The engine 114 may further include an activity generator component 132 that is configured to generate an activity that corresponds to content of the social networking message that is caused to be displayed by the display component 126 on the web page 104. Such activity may be a suggestion, an invitation to the individual 102 to learn more about content of the social networking message, an invitation to the individual 102 to shop for items pertaining to content of the social networking message, etc. Thus, the activity generator component 132 may generate a hyperlink that directs the browser to a search engine if selected, and causes the search engine to execute a search that relates to the content of the social networking message that is displayed by the display component 126 on the web page 104. In another example, if the content 106 of the web page 104 pertains to movies, and the social networking message displayed by the display component 126 pertains to a particular movie, the activity generator component 132 can cause the display component 126 to display an activity pertaining to show times of such movie (e.g., text, a portion of which may be a hyperlink, which states "click here to see movie show times in your area").

The engine 114 may further include an advertisement selector component 134 that can select advertisements to be displayed in conjunction with the social networking message on the web page 104. The advertisement selector component 134 may select advertisements using any suitable technique. For instance, the poster of the message may wish to provide coupons or invitations as advertisements for particular products or services that are recommended by the poster, such that friends of the poster of the social networking message can utilize the coupons or invitations. These advertisements may be deemed trustworthy by the individual 102, since they are provided directly from contacts of the individual 102. In another example, the advertisement selector component 134 can select advertisements to display with the social networking message based at least in part upon an entity extracted from the social networking message by the content analyzer component 118. Thus, for example, social networking messages deemed related to movies may desirably be displayed in conjunction with an advertisement for movie rental stores or movie rental services. In still yet another example, advertisers may bid on keywords in the social networking messages, and the advertisement selector component 134 may select an advertisement for display based at least in part upon such bids.

It is to be understood that the individual 102 can have control over web pages or types of web pages that are subjected to operations of the engine 114. For example, the engine 114 can be configured to be idle when the individual 102 is viewing a secure website such as a banking website. In another example, the individual 102 may specify domains, web pages, etc., where the individual 102 desires that the engine 114 does not execute.

Figure 2:
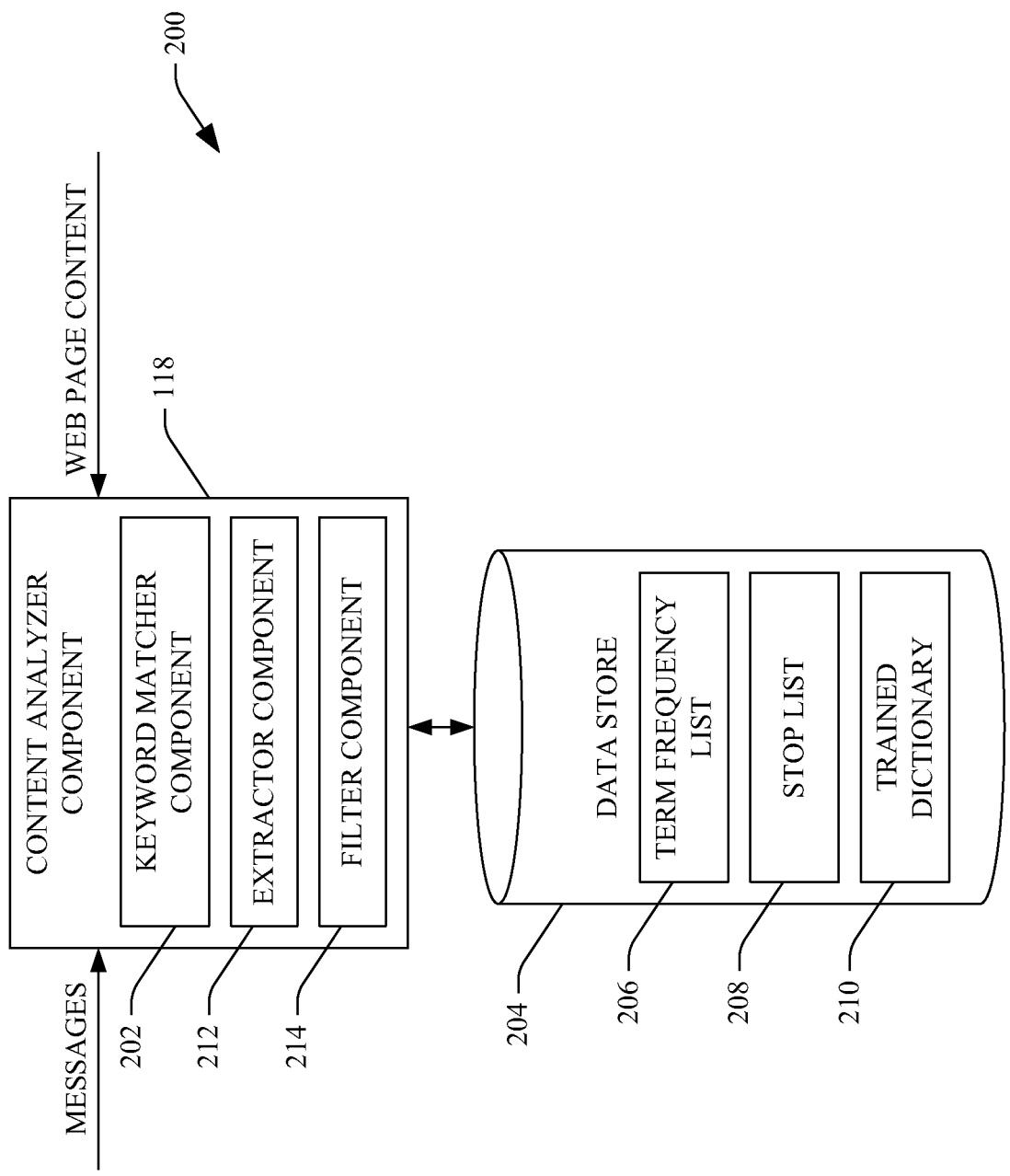
FIG. 2 is a functional block diagram of an example system that facilitates extracting an entity from content of an arbitrary web page being viewed by an individual and/or a social networking message.

With reference now to FIG. 2, an example system 200 that facilitates extracting keywords/entities from web page content and/or social networking messages is illustrated. The system 200 comprises the content analyzer component 118 which, as described above, can receive web page content as well as social networking messages. The content analyzer component 118 can comprise a keyword matcher component 202 that can extract one or more keywords from the web page content and/or the social networking messages. The system 200 further comprises a data store 204 that includes a term frequency list 206, a stop list 208, and a trained dictionary 210. The data store 204 may be implemented as a local, persistent data store such as a hard drive. In another example, the data store 204 may be implemented as a non-persistent store such as an in-memory cache. The term frequency list 206 may include a plurality of terms and frequency of use of such terms. The term frequency list may indicate frequency of terms used in queries, frequency of terms used in particular types of documents, etc. The stop list 208 may include keywords that are not to be extracted from content of a web page or social networking messages. Thus, in operation, the keyword matcher component 202 can select a keyword from the web page content and/or social networking message, compare the selected keyword with data in the term frequency list 206 to ascertain frequency of utilization of the keyword. The keyword matcher component 202 may also access the stop list 208 to determine whether or not the selected keyword is in the stop list 208. Utilization of the term frequency list 206 and the stop list 208 by the keyword matcher component 202 can prevent common keywords from being extracted, such as terms "the", "or", "and", and the like.

The content analyzer component 118 further includes an extractor component 212 that can ascertain canonical meanings of keywords extracted by the keyword matcher component 202. Specifically, the extractor component 212 can receive a keyword extracted by the keyword matcher component 202 and can access the trained dictionary 210 to ascertain canonical meanings of such keywords. The extractor component 212 can analyze context pertaining to the extracted keyword and can access the trained dictionary 210 to learn a canonical meaning of such term. This can be utilized to disambiguate between "Washington State", "Washington D.C.", and "George Washington" when the keyword matcher component 202 extracts the keyword "Washington" from the content of the web page and/or one or more social networking messages. The extractor component 212 may output an entity after accessing the trained dictionary 210, wherein the entity may be a keyword, a keyword and a meaning of the keyword as ascertained from the trained dictionary 210, a topic, etc. There are a variety of techniques to perform entity extraction, and one skilled in the art will understand and appreciate the various forms of the extractor component 212.

With more detail pertaining to the trained dictionary 210, a learning algorithm may be executed over some predefined categorization of terms. Such categorization may be in an encyclopedia, a dictionary, a wiki, or the like. Thus, give a keyword and a particular context, meaning of the keyword for such context can be ascertained via accessing the trained dictionary 210. The meaning of the keyword can include a topic of the keyword, a category assigned to the keyword, a hierarchy of categories or topics assigned to the keyword, etc.

The content analyzer component 118 may additionally include a filter component 214 that filters messages that include inappropriate content. For example, the filter component 214 can analyze social networking messages to determine whether such messages include profanity or some combination of words that may be inappropriate for viewing by the individual 102. Messaged filtered by the filter component 214 can be removed from consideration for display in conjunction with content of a web page.

Figure 3:
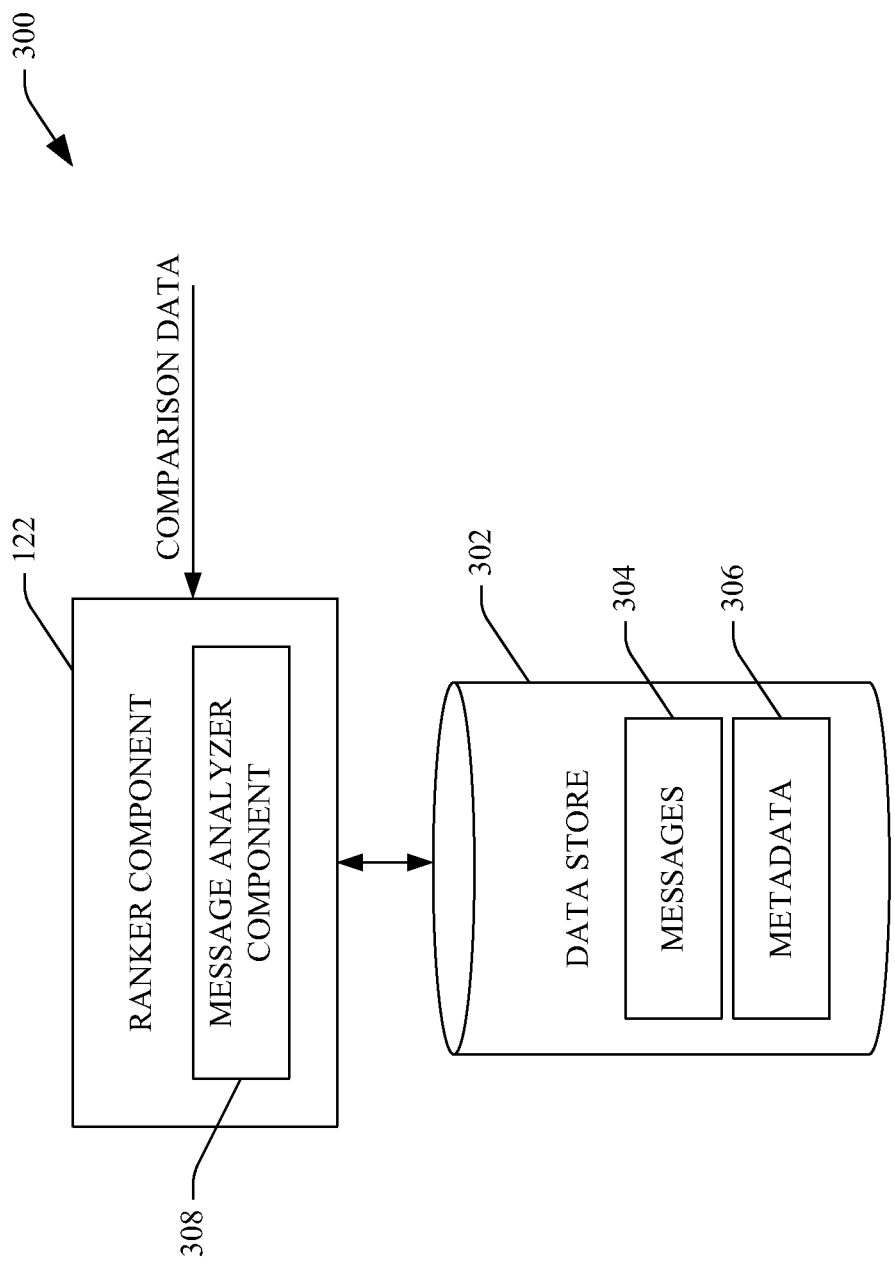
FIG. 3 is a functional block diagram of an example system that facilitates ranking messages from a social networking application with respect to an entity extracted from a web page that is being viewed by an individual.

Referring now to FIG. 3, an example system 300 that facilitates ranking a plurality of social networking messages with respect to how related such messages are with respect to an entity extracted from content of a web page is illustrated. As indicated above, the ranker component 122 receives comparison data from the comparer component 120 (FIG. 1) that indicates whether the entity extracted from content of the web page is similar to or matches an entity extracted from a social networking message. The ranker component 122 can consider such comparison data when assigning a score to the social networking message with respect to the entity extracted from the content of the web page.

The system 300 comprises a data store 302 that includes a plurality of social networking messages 304 and metadata 306 corresponding thereto. The data store 302 may be implemented as a persistent store, such as on a hard drive, or as a non-persistent store, such as an in-memory cache of the social networking messages 304 retrieved from a social networking application 108. The ranker component 122 can comprise a message analyzer component 308 that can access the data store 302 and analyze metadata for a particular social networking message. The ranker component 122 may assigned a score to the social networking message based at least in part upon metadata for the social networking message. Such metadata may include data indicative of the differentiation of content of the social networking message (whether the content is very differentiated, moderately differentiated, slightly differentiated, etc. in comparison to other messages or in comparison to content of the web page being viewed by the individual 102).

The metadata 306 may also include data indicative of whether the individual 102 has read the message, data indicative of an amount of time since the individual read the message, explicit feedback assigned to the social networking message by the individual 102 (e.g., whether the individual liked or disliked the message or marked the message as spam, . . . ), whether the individual 102 selected links corresponding to the social networking message, and/or an identity of the poster of the social networking message. For instance, the ranker component 122 may assign a higher score to a message posted by a close friend of the individual 102 (e.g., a poster that frequently interacts with the individual 102) when compared to a score assigned to a message posted by someone who interacts infrequently with the individual 102. The ranker component 122 can generate a score for each of a plurality of social networking messages 304 and can rank the social networking messages based at least in part upon the assigned scores. These assigned scores are indicative of whether a social networking message is deemed likely to be of interest to the individual 102 in the context of the web page being viewed by the individual 102.

Figure 4:
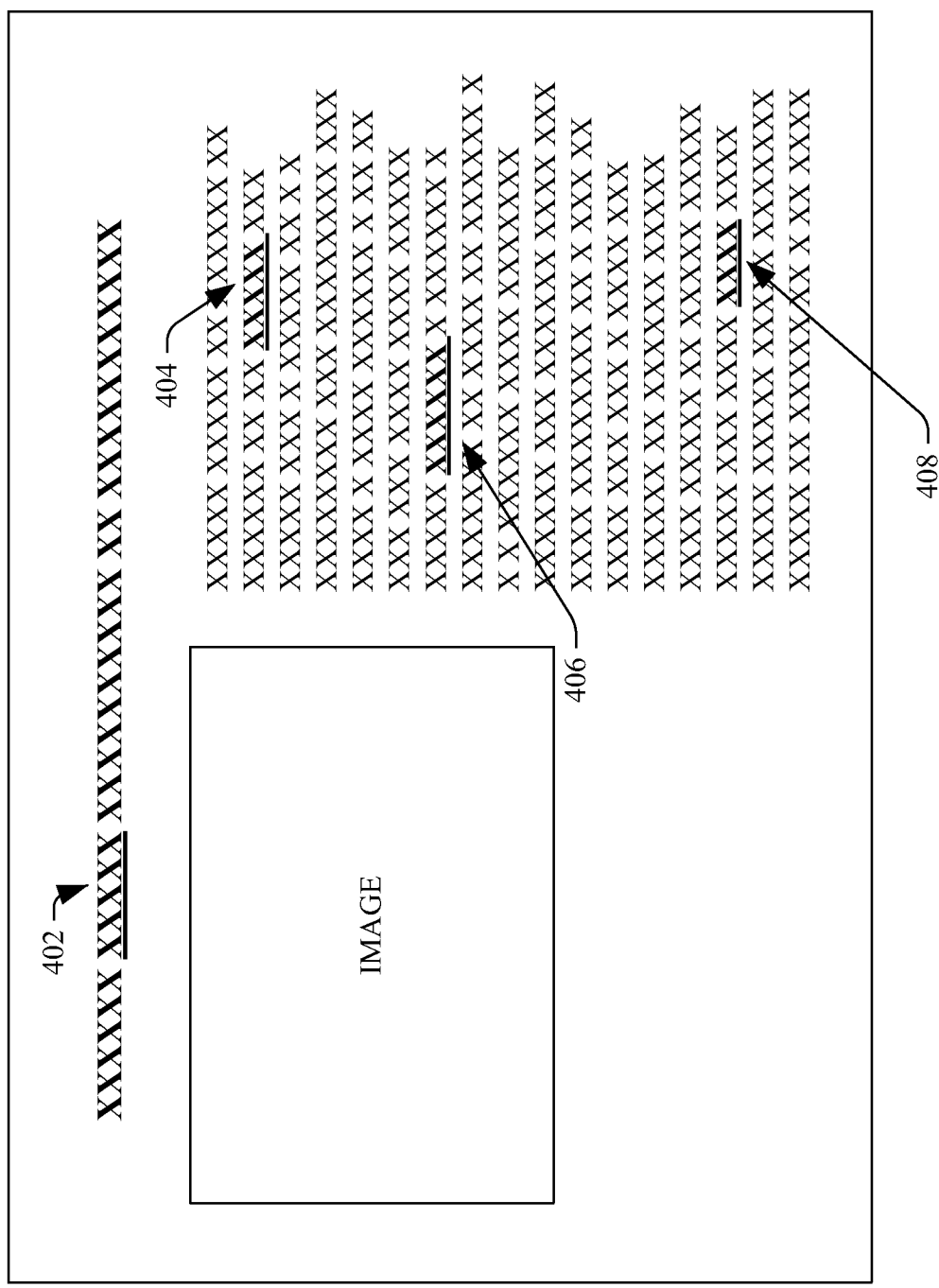
FIG. 4 is an example graphical user interface that comprises highlighted content that can be selected by an individual, wherein the content have social networking messages related thereto.

With reference now to FIG. 4, an example graphical user interface 400 that illustrates entities in the content of a web page that have social networking messages related thereto is illustrated. The graphical user interface 400 may comprise text that is indicative of a title of an article, an image corresponding to the article, and text of the article. As can be ascertained, four entities 402, 404, 406, and 408 have been extracted from the content of the web page and have been found to have social networking messages related thereto, wherein the social networking messages can be posted to a social networking application by a member of the social network of the individual viewing the web page. In another example, the individual 102 may wish to receive updates from the general public with respect to a particular topic via a social networking application. For instance, a member of the general public may write a comment about a particular location, and the individual 102 may wish to receive comments pertaining to such location. In this example, the poster of the message is not a contact of the individual 102 (and thus may not be in a social network of the individual 102), but the individual 102 still desires to receive such information.

As can be seen in this example figure, text is bolded and underlined to indicate that a social networking message is related to such underlined/bolded text. There, of course, other manners for highlighting content of a web page, including altering color of text/images, causing a box to be displayed around entities, etc. Additionally, it can be ascertained that there is nothing obstructing the entities/text from view of the individual. Thus, if the individual does not care to view social networking messages, the individual can read over the content of the web page.

Figure 5:
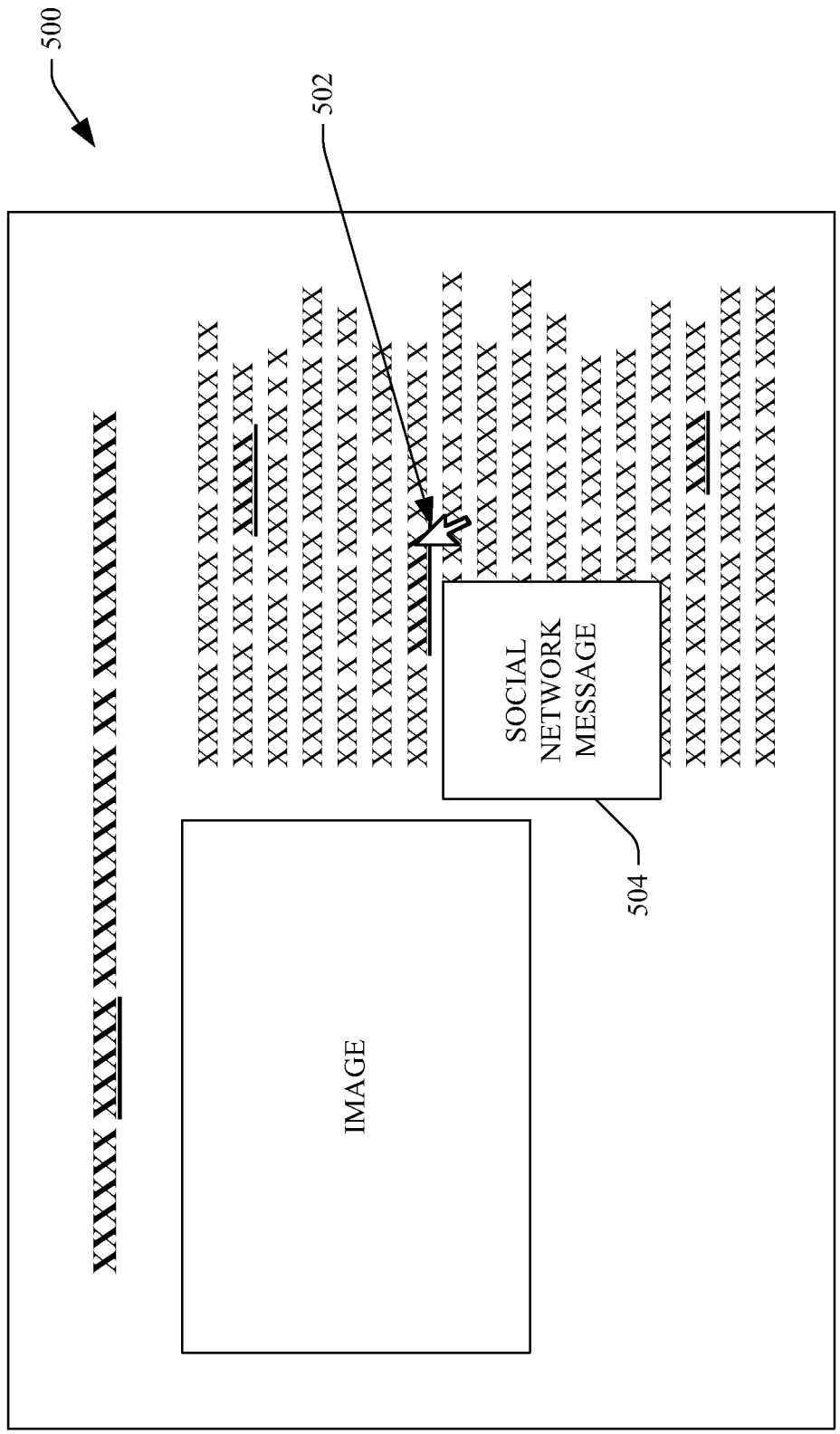
FIG. 5 is an example graphical user interface that depicts selecting on content on a web page being viewed by an individual and a resultant display of a social networking message that is related to the content.

Now referring to FIG. 5, an example graphical user interface 500 that depicts display of a social networking message upon selection of a highlighted entity is illustrated. As can be ascertained, the highlighted entity 406 has been selected by the individual through an input gesture of the individual, such as through utilization of a mouse pointer 502. As described above, selection through use of the mouse pointer may be a left click, a right click, a center button click, a hover over the highlighted entity 406 for a certain period of time, etc. Once it is ascertained that the individual has selected the highlighted entity 406, a corresponding social network message 504 that was found to be related to the highlighted entity 406 is presented to the individual. Other social networking messages may be presented to the individual if the individual selects other highlighted entities in the web page.

As shown in FIG. 5, the social networking message 504 may be presented to the individual as an inline popup that may at least partly obstruct content of the web page. In another example, the social networking message 504 may be displayed in a toolbar of a browser, such that no content of the web page is obstructed. In yet another example, the social networking message 504 may be displayed in a side bar. Of course, other manners for displaying a social networking message in conjunction with content of a web page that relates to the social networking message are contemplated and are intended to fall under the scope of the hereto-appended claims.

Figure 6:
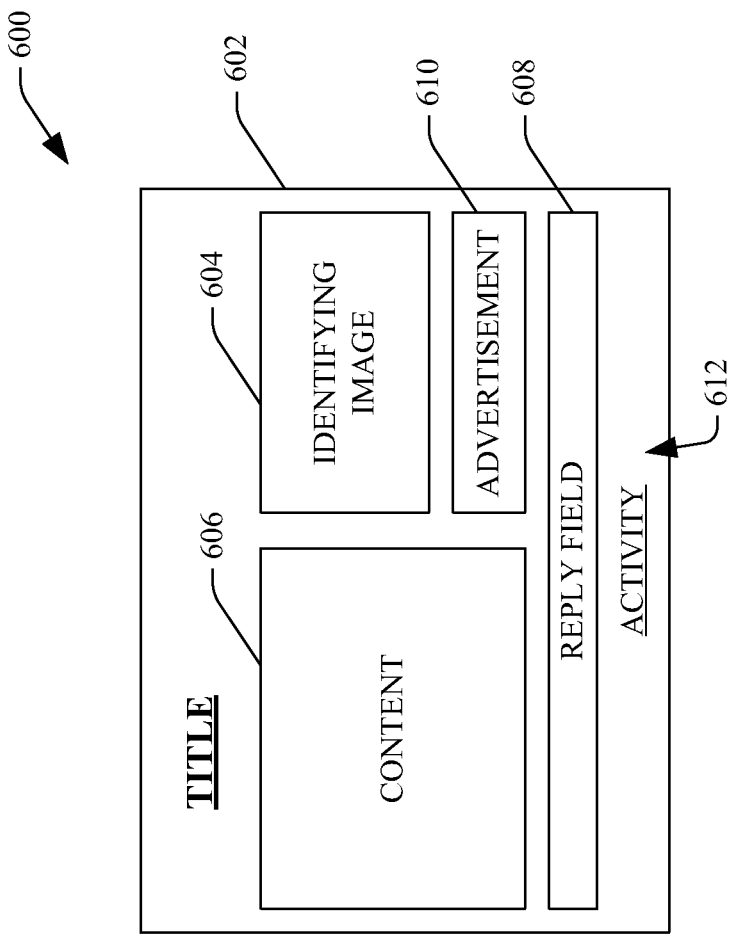
FIG. 6 is an example graphical user interface that depicts example contents of an inline popup window that can be displayed in conjunction with extracted entities from a web page.

Referring now to FIG. 6, an example graphical user interface 600 is illustrated. The graphical user interface 600 depicts a social networking message 602 that can be displayed in conjunction with content of an arbitrary web page being viewed by an individual. In this example, the social networking message 602 may include a title (if such title exists). Additionally, the social networking message 602 may comprise an identifying image 604 that can identity a poster of the social networking message 602. The identifying image 604 may be a photograph of the poster, an avatar, or other suitable image. The social networking message 602 further comprises content 606, which may be textual, photographic, may include video and/or other suitable content. The social networking message 602 may further include a reply field 608 that is configured to receive a reply to the social networking message from the individual viewing the web page. For instance, the individual viewing the web page may insert text into the reply field 608 and select a button (not shown) that causes a reply to be transmitted to one or more social networking applications (e.g., to a profile of the individual and/or the poster of the social networking message 602). Additionally or alternatively, other mechanisms for replying to or providing information about the social networking message 602 are contemplated. For instance, the social networking message 602 may include one or more buttons that allow the individual to indicate quickly whether the individual approves of the message 602 or dislikes the message 602.

Furthermore, the social networking message 602 may optionally include an advertisement 610. The advertisement 610 may be displayed as hyperlinked text, as an image that may be selected by the individual, etc.

The social networking message 602 may further include an activity 612 that may be pursued by the individual, wherein the activity 612 pertains to the content 606 of the social networking message 602. For instance, the content 606 of the social networking message 602 may include recitation of a certain location, and the activity 612 may ask the individual if the individual would like to receive a map of such location. Thereafter, the individual 612 could select a hyperlink corresponding to the activity and a map of the location may be presented to the individual. In another example, the activity 612 may suggest the individual to shop online for a product mentioned in the content 606, search for airline tickets to a destination mentioned in the content 606, or other suitable activity.

Figure 7:
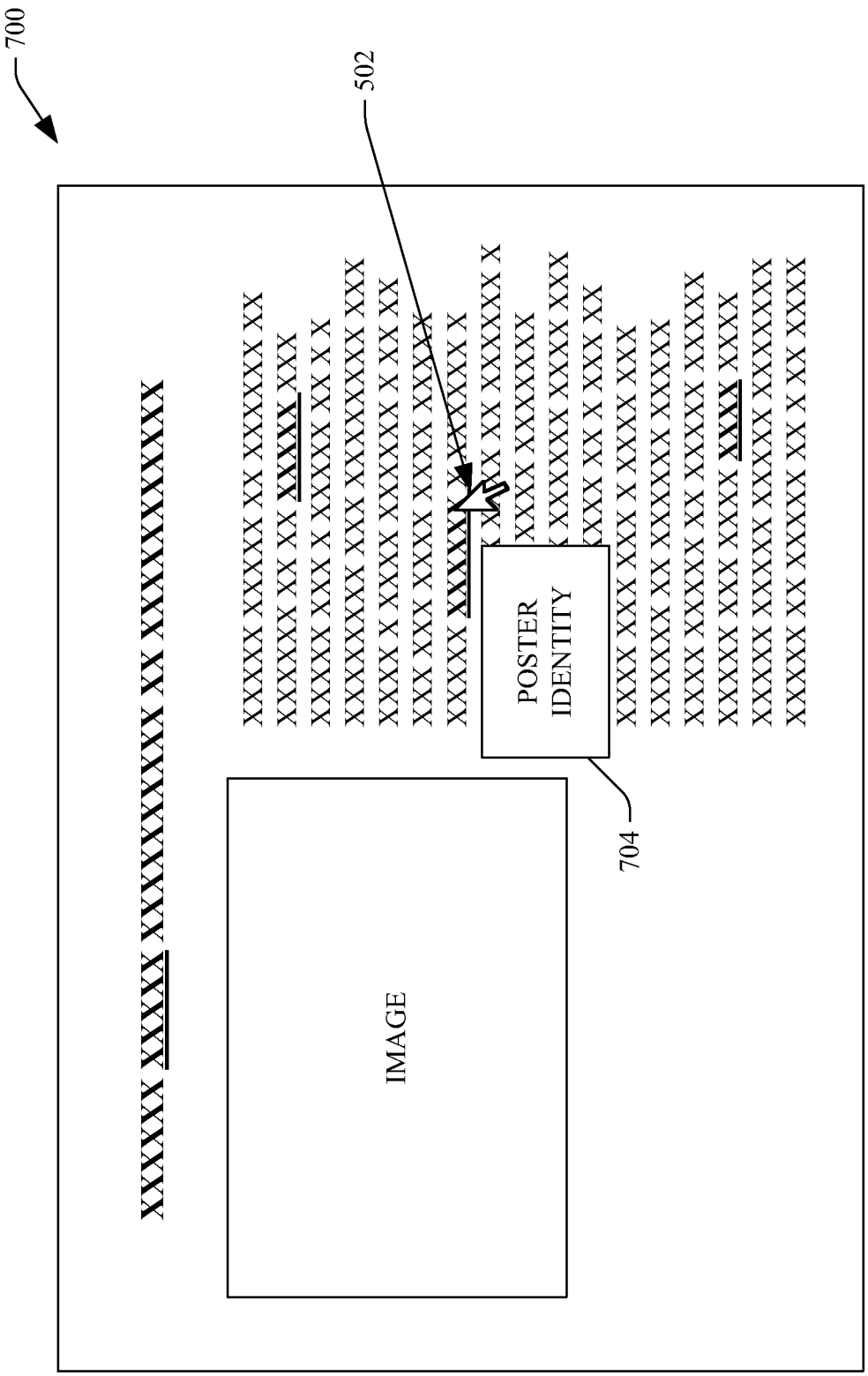
FIG. 7 is an example graphical user interface that depicts presenting a social networking message preview, wherein the underlying social networking message is related to content of an arbitrary web page being viewed by an individual.

Referring now to FIG. 7, an example graphical user interface 700 illustrating an alternative embodiment is presented. In this example, when the individual selects the highlighted entity 406 with the mouse pointer 502, a preview message 704 is presented to the individual, wherein the preview message 704 may include data (images and/or text) that indicates the identity of the poster. Thus, the individual may select the highlighted entity 406, determine who posted the message, and thereafter choose to review the entirety of the message. For instance, the preview message 704 may include a button that causes the button to be expanded to display an entirety of the message to the individual. In another example, the preview message 704 may include a link that causes another browser tab to be opened and causes the browser to load a web page corresponding to a social networking application, wherein the individual can review the social networking message on such web page.

Figure 8:
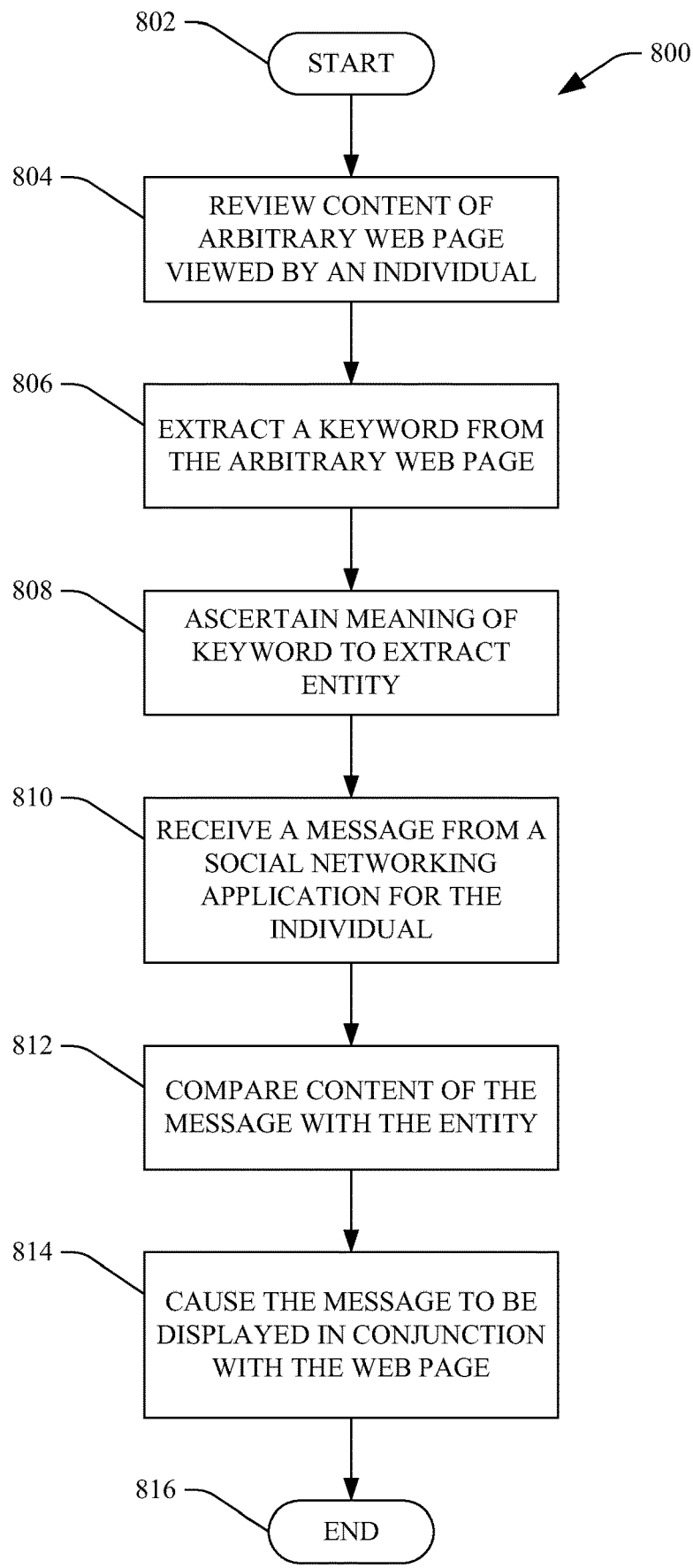
FIG. 8 is a flow diagram that illustrates an example methodology for causing a social networking message to be displayed in conjunction with related content on an arbitrary web page.
Figure 9:
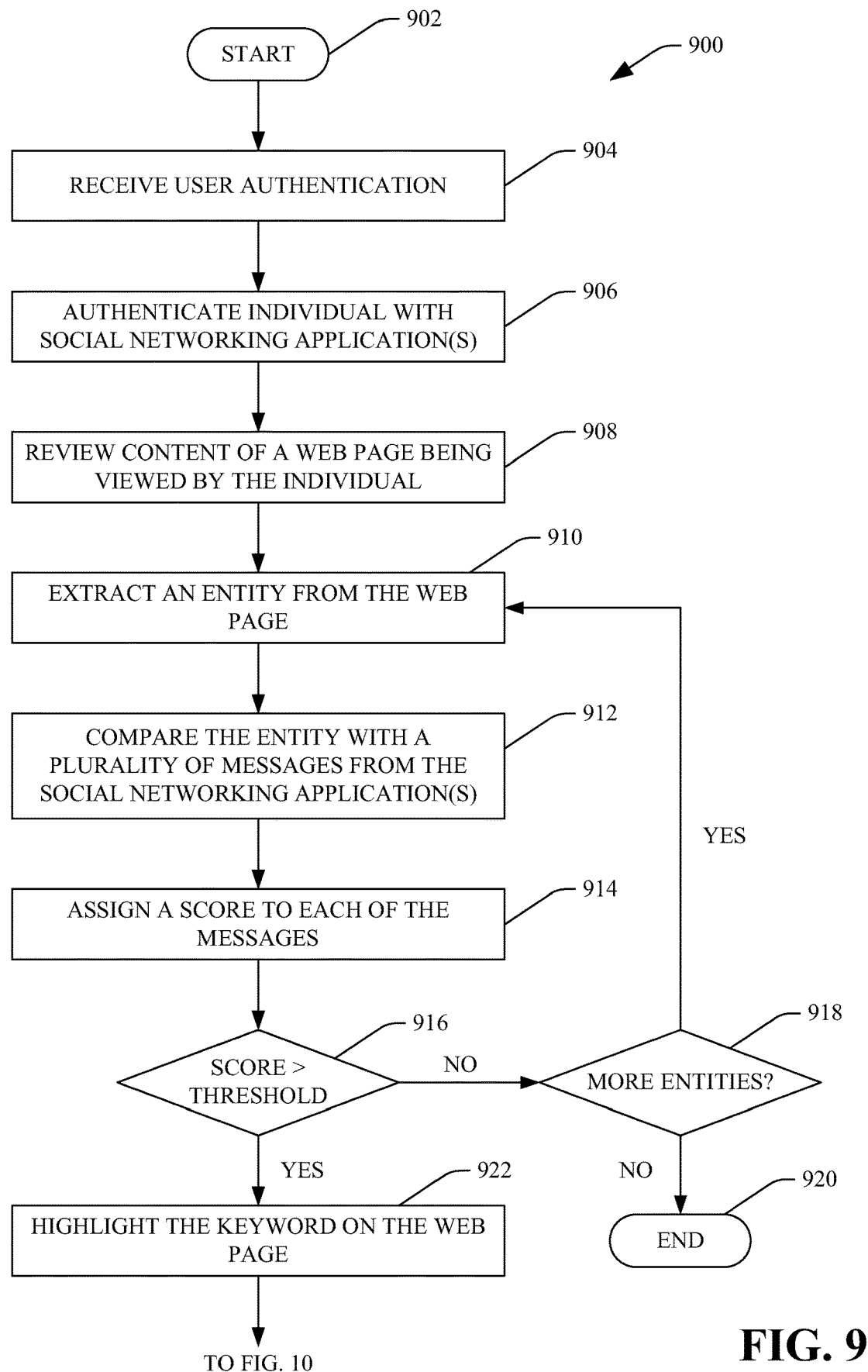
FIGS. 9 and 10 display a flow diagram that illustrates an example methodology for displaying a social networking message in conjunction with related content on a web page and receiving and transmitting a reply to such message.
Figure 10:
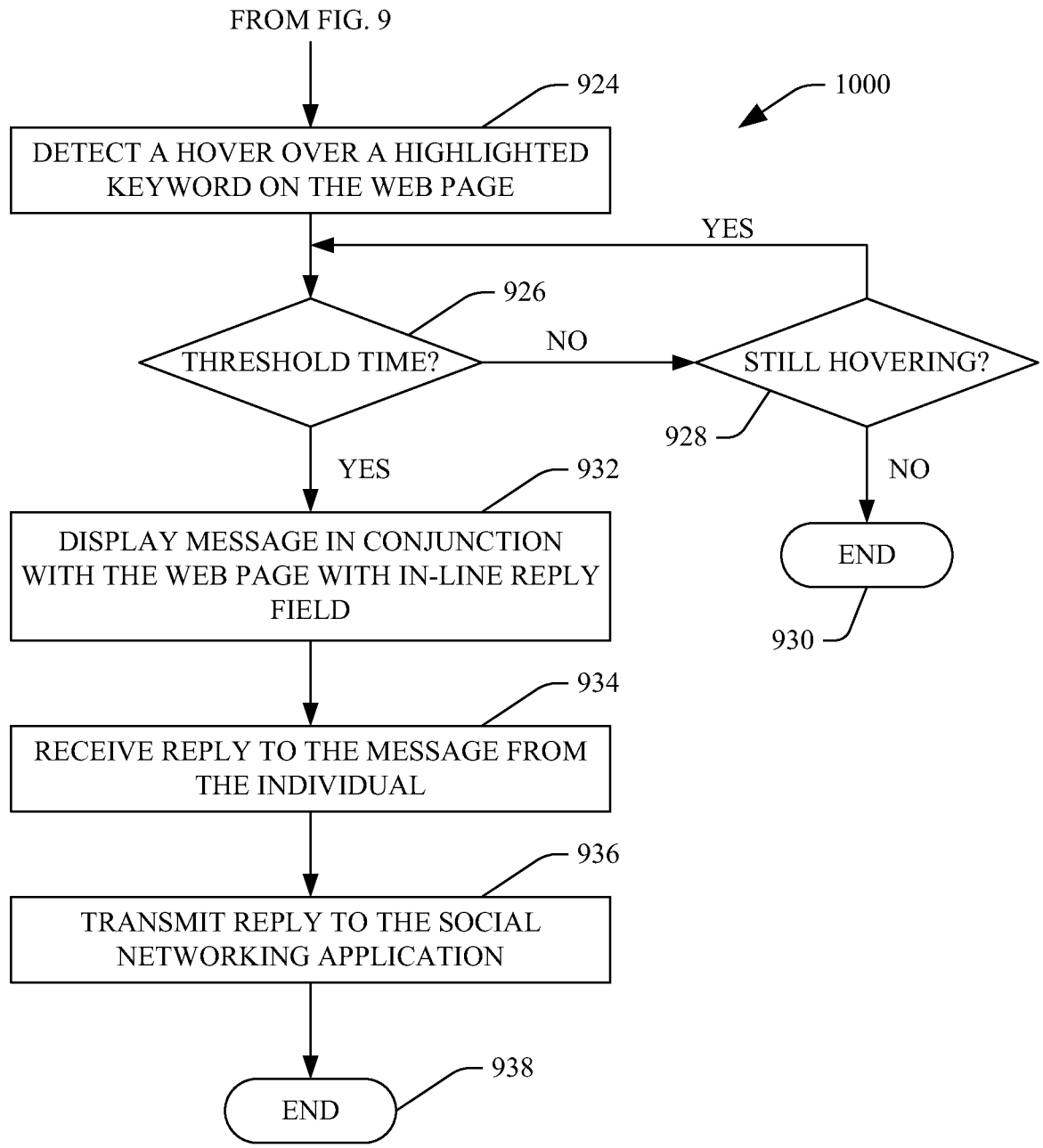

With reference now to FIGS. 8-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates causing a social networking message to be displayed in conjunction with content of an arbitrary web page is illustrated. The methodology 800 begins at 802, and at 804 content of an arbitrary web page being viewed by an individual is reviewed/analyzed. At 806, a keyword is extracted from the arbitrary web page. As described above, the keyword can be extracted through utilization of term frequency information and/or a stop list. At 808, a meaning of the keyword is ascertained based at least in part upon context pertaining to the keyword. For example, a trained dictionary can be accessed and utilized to ascertain the meaning of the extracted keyword. As indicated above, the keyword and corresponding meaning can be referred to as an entity. At 810, a message is received from a social networking application, wherein the message is from a member of the social network of the individual and is intended to be transmitted to the individual from the poster of the message. The message can be received prior to the individual viewing the web page or during the time that the individual is viewing the web page. While not shown in the methodology 800, one or more entities can also be extracted from the received social networking message.

At 812, an entity extracted from the social networking message is compared with the entity extracted from the web page. At 814, the message is caused to be displayed in conjunction with the web page based at least in part upon the comparison undertaken at 812. The methodology 800 completes at 816.

Now referring to FIGS. 9 and 10, an example methodology 900 that facilitates displaying a social networking message in conjunction with a web page being viewed by an individual is illustrated. The methodology 900 starts at 902, and at 904 user authentication data is received. This data may be a username, password, etc. that allows the individual to log into a social networking application. At 906, the individual is authenticated to one or more social networking applications (e.g., the authentication data is transmitted to the social networking application to authenticate the individual).

At 908, content of a web page being viewed by the individual is reviewed/analyzed. Specifically, at 910 one or more keywords can be extracted from the web page. Furthermore, while not shown, an entity can be extracted by learning the meaning of the keyword. At 912, the entity is compared with content of a plurality of messages posted via a social networking application. For instance, each of the social networking messages may have entities extracted therefrom. At 914, a score can be assigned to each of the social networking messages with respect to the entity extracted from the web page.

At 916, scores assigned to the social networking messages are analyzed to determine whether any scores are above a predefined threshold (whether any of the social networking messages are found to closely relate to the entity extracted from the web page). If there are no scores above the threshold, at 918 a determination is made regarding whether any further entities have been extracted from the web page. If further entities have been extracted from the web page, the methodology returns to 910. If each entity has been extracted from the web page, the methodology 900 completes at 920.

If at decision block 916 it is determined that at least one social networking message is assigned a score above the threshold, then the methodology 900 continues to 922, where the keyword corresponding to the entity is highlighted on the web page. This can provide notice to the individual that a social networking message has been received that relates to the highlighted keyword. The methodology 900 then continues to FIG. 10.

At 924, a hover is detected over a highlighted keyword on the web page. At 926, a determination is made regarding whether the mouse pointer has been hovered over the keyword for a threshold amount of time. If it is determined that mouse pointer has not been hovered over the keyword for the threshold amount of time, then at 928 a determination is made regarding whether the mouse pointer continues to hover over the keyword. If the mouse pointer continues to hover over the keyword, then the methodology 900 returns to 926. If the mouse pointer no longer hovers over the highlighted keyword, then the methodology 900 completes at 930.

If at decision block 926 a determination is made that the mouse pointer hovers over the keyword for the threshold amount of time, then the methodology 900 proceeds to 932 where the social networking message with the score above the threshold is displayed in conjunction with the web page, wherein the message is displayed with an inline reply field that is configured to receive a reply to the social networking message from the individual. At 934, a reply to the message is received from the individual. At 936, the reply to the message is transmitted to the social networking application from which the message was received. This reply may be posted on a profile of the individual, for instance. The methodology 900 completes at 938.

Figure 11:
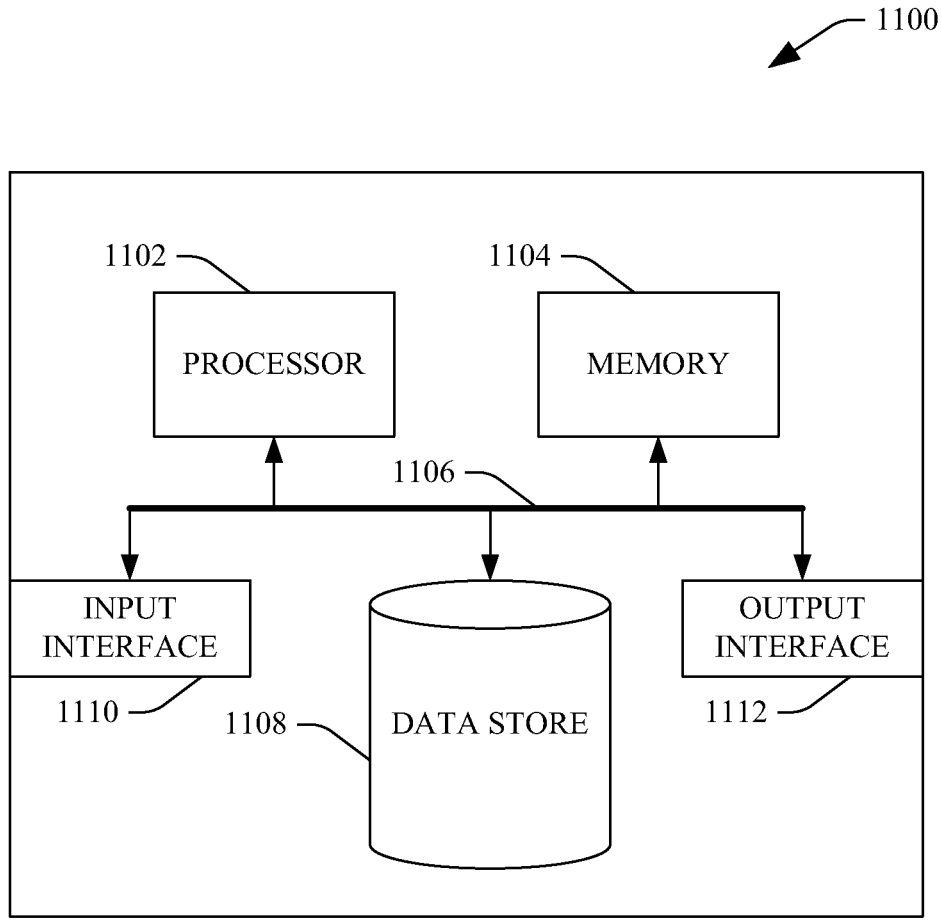
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports displaying web pages to users. In another example, at least a portion of the computing device 1100 may be used in a system that supports causing a social networking message to be displayed in conjunction with content on a web page that is related to the social networking message. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store social networking messages, user authentication information, etc.

The computing device 1100 additionally includes a data store 1108 that is accessible by the processor 1102 by way of the system bus 1106. The data store 1108 may include executable instructions, social networking messages, web pages, a trained dictionary, etc. The computing device 1100 also includes an input interface 1110 that allows external devices to communicate with the computing device 1100. For instance, the input interface 1110 may be used to receive instructions from an external computer device, from an individual, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. In another example, a component may be a portion of memory or a set of transistors. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   responsive to an application executing on a client computing device requesting a page, extracting an entity from the page, the entity being at least one keyword on the page and a canonical meaning of the at least one keyword;
   comparing the entity with entities extracted from messages generated by way of a social networking application, the messages being associated with an account of a user of the client computing device, the account being with the social networking application;
   identifying a message in the messages based upon the comparing of the entity extracted from the page with the content of the plurality of messages;
   responsive to a selection of the hyperlink, displaying the results of the search engine on a display of the client computing device; and
   further comprising causing a hyperlink to be displayed in the message, the hyperlink is configured to direct the application to a search engine when the hyperlink is selected, wherein the hyperlink is further configured to cause the search engine to execute a search based upon content of the message.

2. A system, comprising:
   at least one processor; and
   memory that stores instructions that, when executed by the at least one processor, cause the at least one processor to perform acts comprising:
      in response to a page being requested by an application, extracting an entity from the page, the entity being:
         at least one keyword on the page; and
         a canonical meaning of the at least one keyword;
      performing a comparison between the entity extracted from the page and a plurality of entities extracted from content of a plurality of messages posted by way of a social networking application, wherein the messages are associated with an account of a user of the application;
      selecting a message from the messages based upon the comparison;
      responsive to the hyperlink being selected, displaying the results of the search engine on a display of a client computing device; and
      further comprising generating a hyperlink to be displayed in the message, the hyperlink is configured to direct a browser to a search engine when the hyperlink is selected by the user, the hyperlink is further configured to cause the search engine to execute a search based upon the entity extracted from the page.

3. A computer-readable memory comprising instructions that, when executed by a processor, cause the processor to perform acts comprising:
   receiving an indication that an individual is viewing an arbitrary page, the arbitrary page comprises content;
   responsive to receiving the indication, identifying an entity in the content of the arbitrary page, the entity being at least one keyword and a canonical meaning of the at least one keyword, wherein identifying the entity comprises:
      extracting the at least one keyword from the content of the arbitrary page; and based upon a context in which the at least one keyword occurs in the content of the arbitrary page, determining the canonical meaning of the at least one keyword; comparing the entity with content of a message posted by way of a social networking application from a contact of the individual;
      determining that the content of the message is related to the entity based upon the comparing of the entity with the content of the message;
   and responsive to determining that the content of the message is related to the entity, highlighting the entity on the arbitrary page.

* * * * *